Sept. 29, 1959 J. H. MELETIO ET AL 2,906,850
COOKING UNITS ADAPTED FOR USE IN RESTAURANTS
AND SIMILAR FOOD ESTABLISHMENTS
Filed April 4. 1955 4 Sheets-Sheet 1
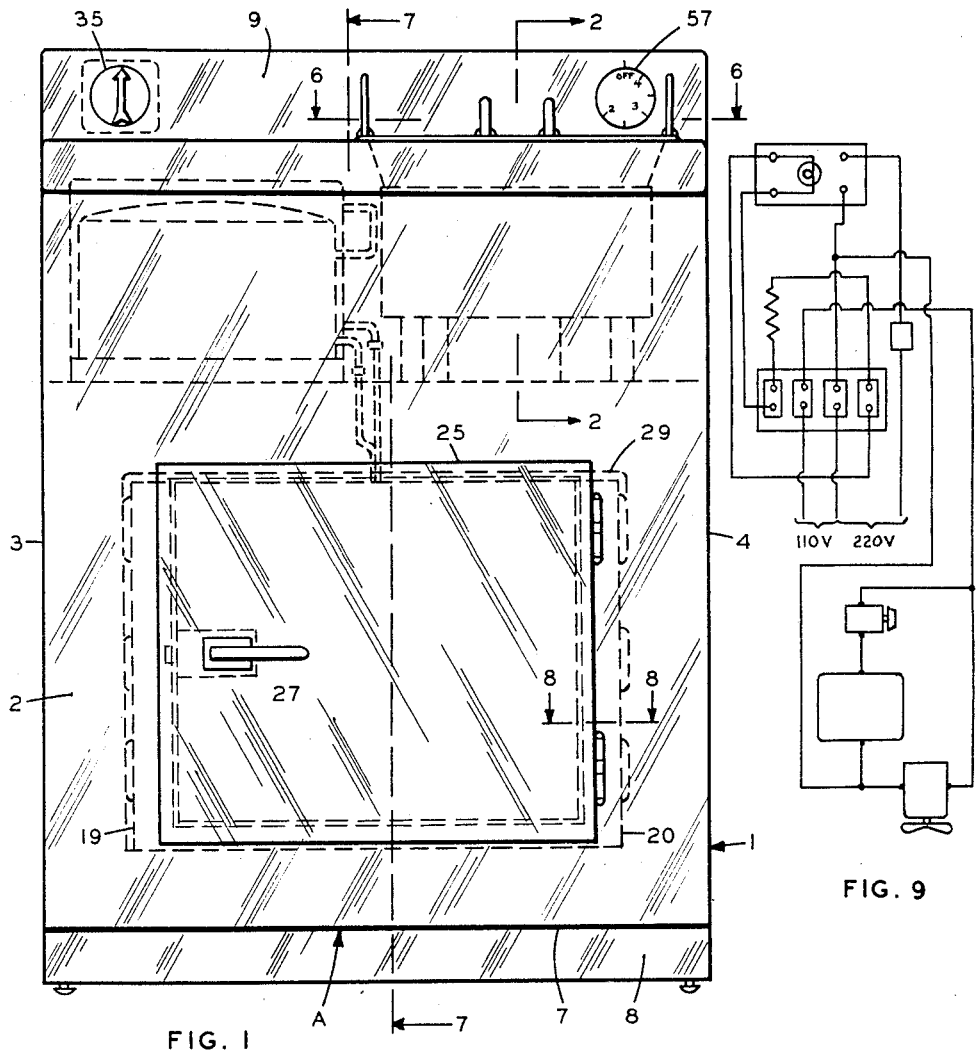
FIG. 1
FIG. 9
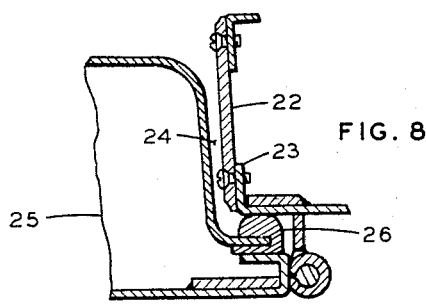
FIG. 8
*INVENTOR.*
JOHN H. MELETIO
MAX MEYER
BY *Alfred W. Setchafr*
ATTY.

Sept. 29, 1959    J. H. MELETIO ET AL    2,906,850
COOKING UNITS ADAPTED FOR USE IN RESTAURANTS
AND SIMILAR FOOD ESTABLISHMENTS
Filed April 4, 1955    4 Sheets-Sheet 2
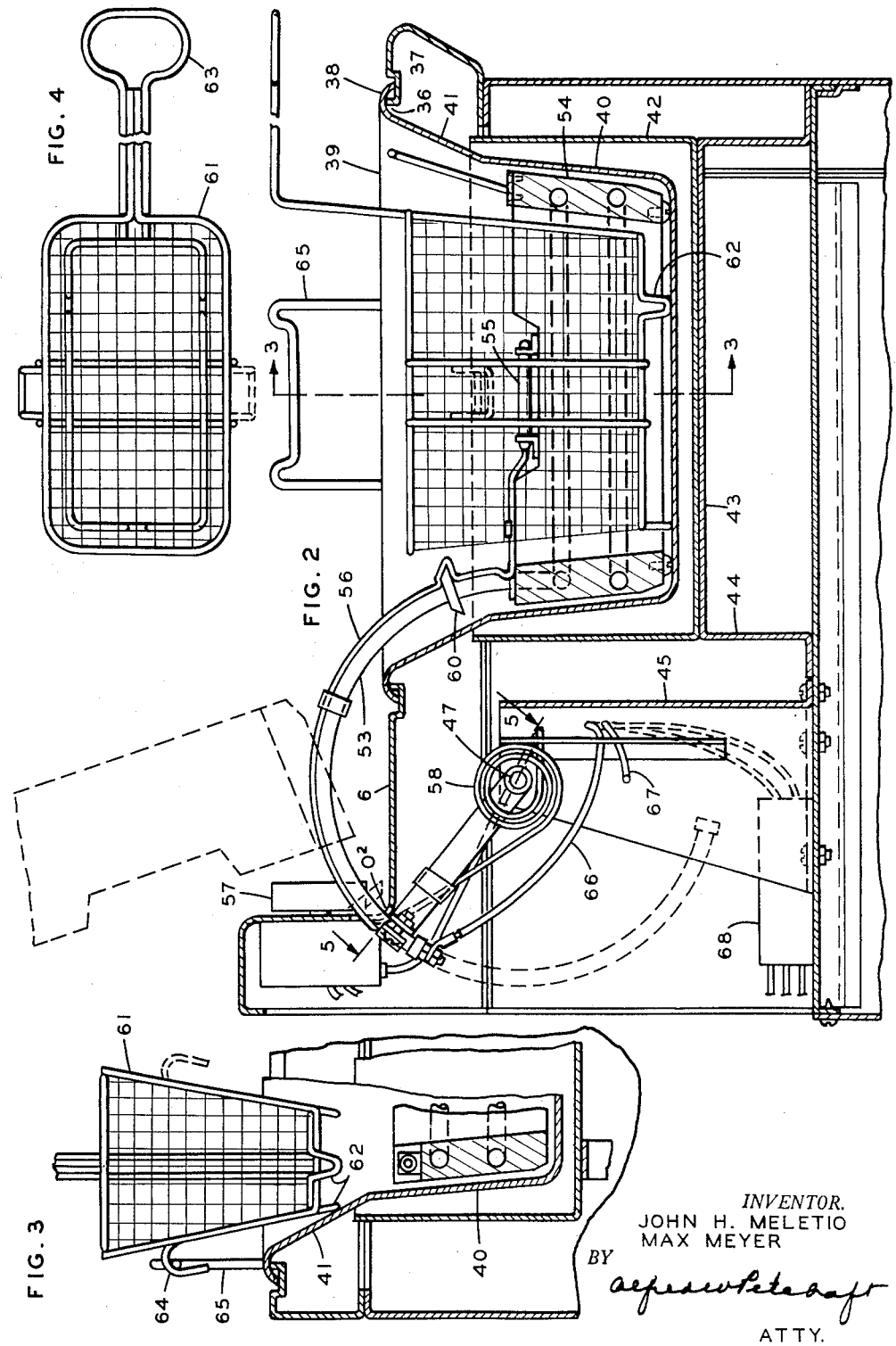
INVENTOR.
JOHN H. MELETIO
MAX MEYER
BY
ATTY.

Sept. 29, 1959  J. H. MELETIO ET AL  2,906,850
COOKING UNITS ADAPTED FOR USE IN RESTAURANTS
AND SIMILAR FOOD ESTABLISHMENTS
Filed April 4. 1955  4 Sheets-Sheet 3

*INVENTOR.*
JOHN H. MELETIO
MAX MEYER
BY
ATTY.

Sept. 29, 1959  J. H. MELETIO ET AL  2,906,850
COOKING UNITS ADAPTED FOR USE IN RESTAURANTS
AND SIMILAR FOOD ESTABLISHMENTS
Filed April 4, 1955  4 Sheets-Sheet 4

INVENTOR.
JOHN H. MELETIO
MAX MEYER
BY
ATTY.

United States Patent Office 2,906,850
Patented Sept. 29, 1959

2,906,850

COOKING UNITS ADAPTED FOR USE IN RESTAURANTS AND SIMILAR FOOD ESTABLISHMENTS

John H. Meletio, Clayton, Mo., and Max Meyer, Jacksonville, Fla.

Application April 4, 1955, Serial No. 499,112

7 Claims. (Cl. 219—43)

This invention relates in general to certain new and useful improvements in culinary equipment and, more particularly, to a cooking unit adapted for use in restaurants and similar food establishments.

At the present time, it is a common practice in the restaurant business to maintain deep, heated vessels or cooking wells filled with very hot oil or grease into which food products, such as breaded fish, various types of meats, fritters, doughnuts, and the like can be "deep fried," as it is generally called. For example, in the preparation of French fried potatoes or French fried shrimp, the food is placed in an open-mesh basket and plunged into the hot oil or grease wherein it remains until it is properly cooked and browned. This type of food-preparing operation, generally known as deep frying, involves a series of closely related problems. In the first place, the grease or oil must be kept at the right temperature at all times. The vessel in which the cooking is done, as well as any heating elements, cooking baskets, or other collateral equipment must be of such nature as to be readily cleansed from time to time, not only for sanitary purposes, but also to prevent the accumulation of off-taste and odors. It is also well recognized that in any restaurant or food establishment, floor space is at a premium and consequently it is essential that food preparing equipment be compact and economical in terms of space-requirements.

There is also a further problem which has to do with the inherent nature of foods which are subject to deep frying and which has had little, if any, consideration or study. Practically all foods which can be deep fried spoil readily unless kept under proper conditions of refrigeration prior to cooking and tend to pick up odors from other foods when stored in close proximity thereto. For example, if potatoes, which have been peeled and sliced for preparation as French fried potatoes, are stored in a refrigerator next to strong flavored meat or fish, the potatoes will take on an undesirable taste and odor which seems to be intensified in the frying process and, therefore, is highly detectable when the food is eaten. Strangely enough, the same thing is true of fish products, which, in themselves, have a strong characteristic odor. Many mild-flavored fish, such as haddock and shrimp, while communicating a fishy flavor to adjacent food products, will simultaneously take on an off-flavor from the other foods and the resulting deep-fried product will not have a desirable natural taste.

Entirely apart from the matter of off-flavor, it is extremely desirable that foods intended for deep frying should be chilled just prior to deep frying. For instance, most cooks will chill potatoes in an ice water bath and then dry them off on a towel or similar absorbent material just before placing them in the hot grease or oil. The same thing is true of most other foods which are to be deep fried. Even pastry mixes such as doughnut and fritter batters should be chilled before being introduced into the hot fat or oil. For these various reasons, it is highly desirable to provide a deep frying unit in which the cooking vessel is combined with a relatively small compact refrigerated storage compartment in which a particular food can be isolated and stored under refrigerated conditions which will not only prevent spoilage and the acquisition of off-flavors, but will also keep the food product appropriately chilled so as to be in proper condition for introduction into the hot fat or grease.

It is, therefore, the primary object of the present invention to provide a cooking unit which uniquely combines in a unitary structure a deep frying vessel and a refrigerated storage compartment, so that the food, which is to be deep fried, can be stored by itself under properly refrigerated conditions and maintained at a temperature which is ideal for introduction into the hot fat or oil used in the deep frying process.

It is another object of the present invention to provide a cooking unit of the type stated which is compact and efficient in construction and arrangement so as to occupy a minimum of space in a restaurant or food establishment and simplify all the necessary operations attendant upon the preparation, storage, and deep-frying of food products.

With the above and other objects in view, our invention resides in the novel features of form, construction, arrangement, and combination of parts presently described and pointed out in the claims.

In the accompanying drawings (four sheets)—

Figure 1 is a front elevational view of a cooking unit constructed in accordance with and embodying the present invention;

Figure 2 is a fragmentary sectional view taken along line 2—2 of Figure 1;

Figure 3 is a fragmentary sectional view taken along line 3—3 of Figure 2;

Figure 4 is a top plan view of the frying basket forming a part of the present invention;

Figure 6:
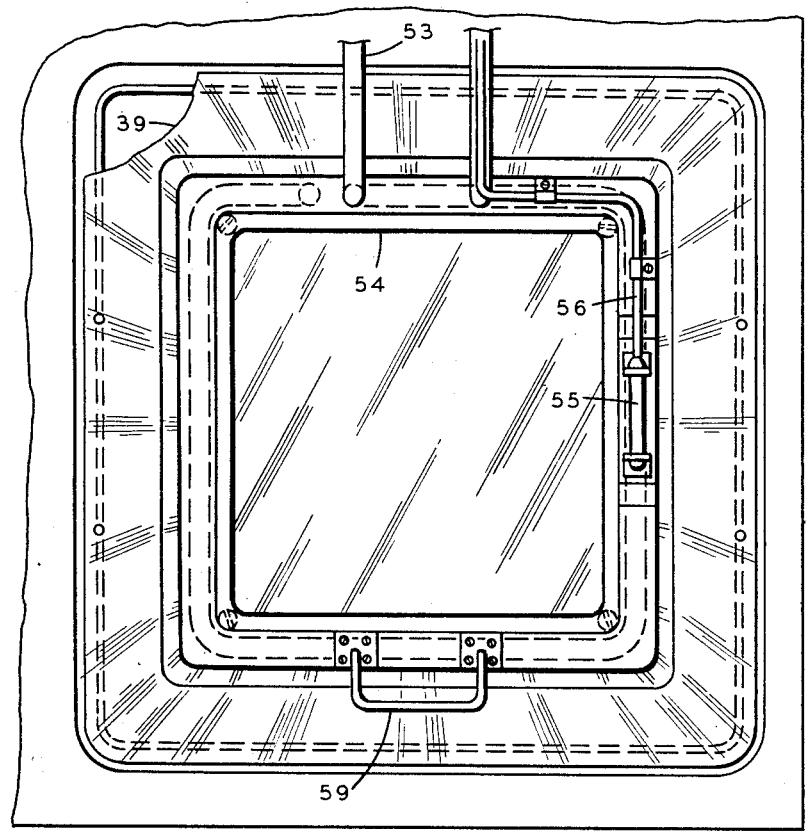
Figure 10:
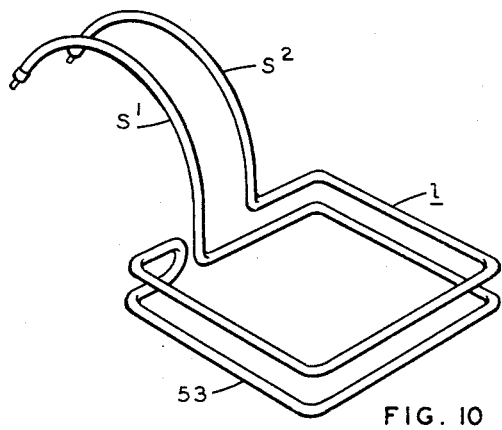
Figure 5:
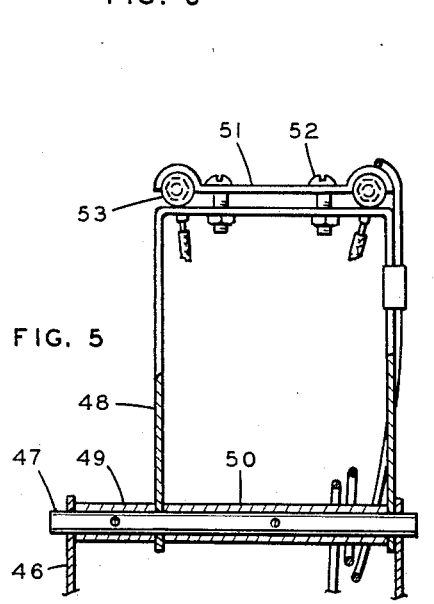
Figure 5 is a fragmentary sectional view taken along line 5—5 of Figure 2.
Figure 7:
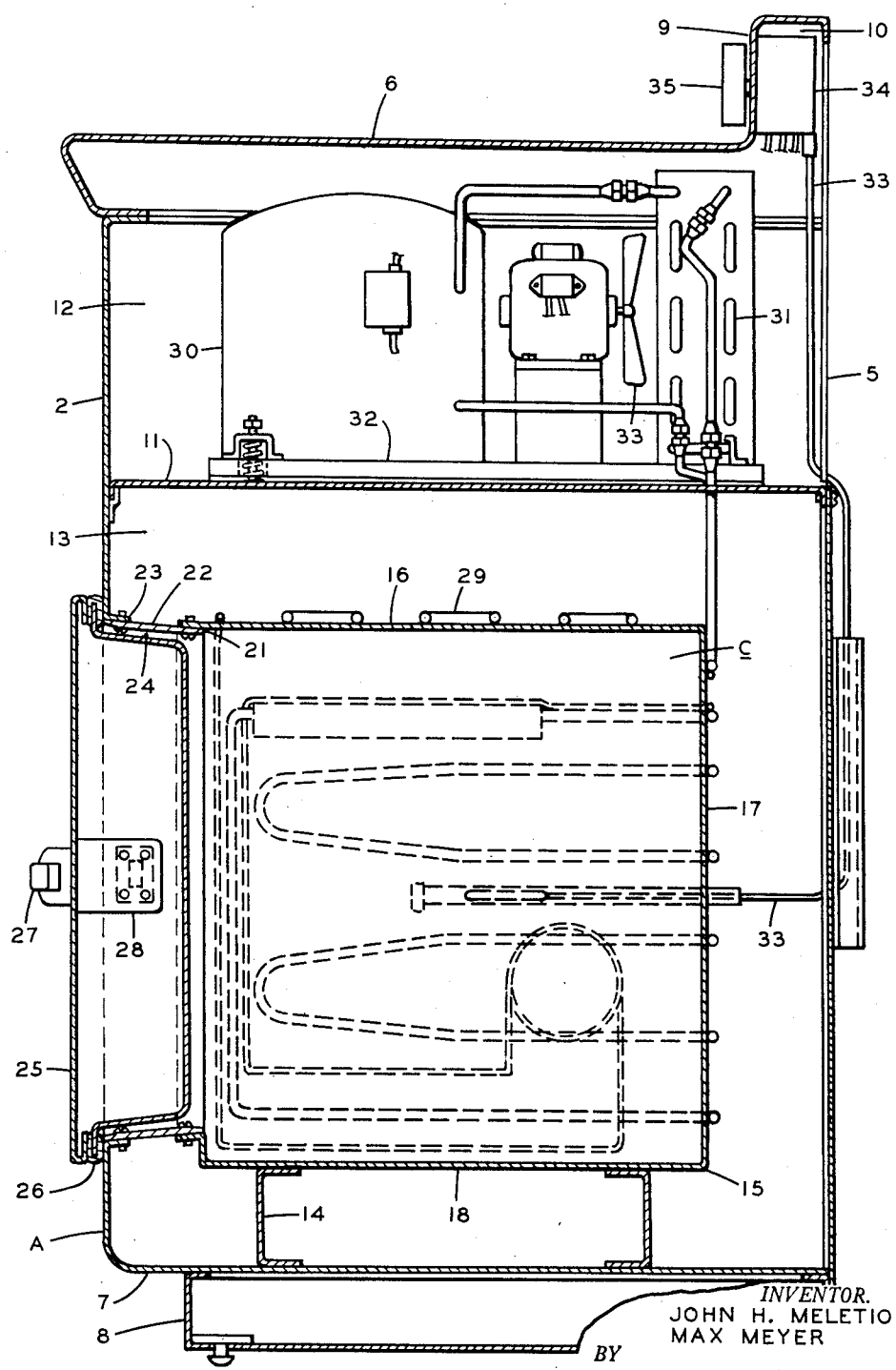

Figures 6, 7, and 8 are fragmentary sectional views taken along lines 6—6, 7—7, and 8—8, respectively, of Figure 1;

Figure 9 is a schematic wiring diagram showing the electrical connections and circuitry forming a part of the present invention; and Figure 10 is a perspective view of the heating element forming a part of the present invention.

Referring now in more detail and by reference characters to the drawings, which illustrate a preferred embodiment of the present invention, A designates a cooking unit comprising an outer shell or housing 1 formed of sheet metal and including a front wall 2, side walls 3, 4, a back wall 5, a top wall 6, and a bottom wall 7, the latter resting upon a rectangular base-frame 8 which, in effect, forms an indented pedestal adapted for supporting the cooking unit A. It will, of course, be understood that the visible exterior surfaces of the housing 1 may be painted or otherwise decoratively finished in any desired manner. Furthermore, the back wall 5 extends upwardly and the top wall 6, at its rear margin, curves upwardly and rearwardly to meet it in the provision of an instrument-panel 9 and instrument-compartment 10.

Marginally secured to the inner faces of the front, side, and rear walls 2, 3, 4, 5, and extending horizontally thereacross is a heavy, strong partition 11 which subdivides the housing 1 into an upper compartment 12 and a lower compartment 13. Mounted wholly within the lower compartment 13, upon spaced channels 14, is a rectilinear inner shell 15 having a top wall 16, back wall 17, bottom wall 18, and side walls 19, 20, in the formation of a storage chamber c. The forwardly presented margins of the walls 16, 18, 19, and 20, furthermore, define a flanged rectangular access-opening 21 which is framed or bounded by a continuous collar 22 formed of hard rubber, a phenol-formaldehyde resin, or similar material which has a relatively low coefficient of heat-conductivity, and is similarly joined around its forward margins to a continuous flange 23, which, in turn, defines an access-opening 24 formed in the front wall 2. Conventionally hinged upon the front wall 2 for disposition across and within the opening 24 is a closure 25 of typical refrigerator-door construction having a rubber sealing gasket 26 and a hand-latch 27 located for engagement in a detent-fitting 28, all as best seen in Figures 1 and 7.

Welded or otherwise tightly attached to the outer faces of the shell 15 is a continuous evaporator tube 29 which is connected in closed gas-circuit with a conventional hermetic compressor 30 and condenser 31 which, together with conventional controls (not specifically shown), comprise a refrigeration system, the latter being mountd on a base 32 which is, in turn, mounted on the partition 11. Also mounted on the base 32 is a motor driven fan 33 located in front of the condenser 31 for the purpose of circulating cooling air therethrough and the back wall 5 is suitably vented directly to the rear of the condenser 31 to facilitate the outward flow of heat-laden air. Also associated with the refrigeration system is a sensory tube 33 which is connected to a manual thermostatic control 34 located in the instrument-compartment 10 and has a forwardly presented control knob 35.

The top wall 6 is provided with a rectangular opening 36 having a continuous channel-shaped ledge 37 which supportively engages the downwardly curved arcuate lip 38 of a stainless steel cooking vessel 39 integrally including a bottom portion or well 40 and an inclined top portion or apron 41. The vessel 39 fits loosely down into a secondary pan 42 which is supported in upwardly spaced relation to the partition 11 by means of a supporting plate 43 having vertical legs 44 which are substantially flush with the side walls of the secondary pan 42.

Bolted to, and extending vertically upwardly therefrom to the rear of the secondary pan 42, is a bracket 45 having spaced parallel side legs 46 which support the ends of a horizontal shaft 47 upon which is journaled a U-shaped frame 48 and spacing quills 49, 50. Rigidly attached to the bight portion of the frame 48 by means of a clip 51 and bolts 52 is an electric heating element 53 of the enclosed tubular type and bent into the form of a double rectangular loop $l$ having two spaced parallel semi-circular arms $S^1$ and $S^2$, which extend loosely through openings $O^1$ and $O^2$, respectively, in the top wall 6. The loop $l$ of the heater element 53 is embedded in a heavy-walled rectangular heat-distribution collar 54 which is shaped to fit loosely within and around the side walls of the well 40 substantially as shown in Figure 2. The collar 54 is, furthermore, provided with a temperature sensing bulb 55 which is connected through a tube 56 to a manually settable thermostatic control element 57 located in the instrument-compartment 10, the tube 56 being provided with a spiral section 58 which is concentric with the shaft 47 so that the heating element 53 and its associated heat distribution collar 54 can be swung into and out of the well 40 from the position shown in dotted lines to the position shown in full lines in Figure 2. The heat distribution collar 54 is also provided with a bail or handle 59 to facilitate such manipulations. Finally, the arms $S^1$, $S^2$, of the heating element 53 are provided with cup-shaped annular collars 60 which catch any hot oil or grease running down from the heating element 53 when the latter is in up-tilted position. The collars 60 also act as stop elements when the heating element 53 is in up-swung position.

Provided for removable disposition within the well 40 and inside the heat distribution collar 54 is a formed-wire cooking basket 61 having short legs 62 by which it is supported upon the bottom of the well 40. The basket 61 is also provided with a handle 63 by which it may conveniently be lifted out of the well 40 and formed on the side wall of the basket 61 is a hook 64 adapted for engagement with an upstanding wire bracket 65 as shown in Figure 3. It will be noted that in this latter position, the legs 62 rest against the apron 41 of the cooking vessel 39 so that the fried food can drain freely and any oil or grease dripping therefrom will run back into the well 40. It should also be noted that the heating element 53 is electrically connected by means of flexible leads 66, 67, to a connector block 68 and, thence, in a conventional manner to the control element 57 which is, in turn, connected to a conventional source of electrical power, the various electrical connections being diagrammatically shown in Figure 9.

In use, raw frozen fish or similar uncooked food is placed in the storage chamber $c$ which is kept at suitable low temperature by the refrigerating system. Cooking oil is poured into the well 40 and the heating element 53 energized to bring the cooking oil up to desired temperature in accordance with the setting of the thermostatic control 58. When the oil is up to cooking temperature, the food to be cooked is placed in the basket 61 and immersed in the hot oil. As soon as the food has been properly cooked, the basket 61 is hooked on the bracket 65 and the food allowed to drain. Because the area above the well 40 is warmed by the heat rising from the hot oil and the heat distribution collar 54, the draining food will remain hot and crisp for serving. When cooking operations have been finished, the heating element 53 and its associated heat distribution collar 54 can be swung up and out of the cooking vessel and wiped clean. Similarly, the cooking vessel 39 can be emptied and thoroughly cleaned. The portion of the top wall 6 to one side of the cooking vessel 39 affords a convenient work-space for breading or otherwise treating the food preparatory to cooking.

It should be understood that changes and modifications in the form, construction, arrangement, and combination of the several parts of the cooking unit adapted for use in restaurants and similar food establishments may be made and substituted for those herein shown and described without departing from the nature and principle of our invention.

Having thus described our invention, what we claim and desire to secure by Letters Patent is:

1. A deep fryer comprising a deep well cooking vessel having a plurality of side walls and an inclined apron thereabove, a bracket rigidly mounted adjacent to the cooking vessel, a shaft carried by said bracket, a U-shaped frame swingably mounted on said shaft, and an electric heating element having a pair of arms mounted on the bight of said U-shaped frame for removable disposition within the cooking vessel, said heating element furthermore being embedded in a heavy-walled heat-distribution collar shaped to fit loosely within the cooking vessel adjacent the side walls and being open at its center for reception of a cooking basket.

2. A deep fryer comprising a deep well cooking vessel having a plurality of side walls, a bracket rigidly mounted adjacent to the cooking vessel, a shaft carried by the bracket, a U-shaped frame swingably mounted on said shaft, and an electric heating element having a pair of arcuate arms mounted on the bight of said U-shaped frame for removable disposition within the cooking vessel, said heating element furthermore being embedded in a heavy-walled heat-distribution collar shaped to fit loosely within the cooking vessel adjacent the side walls and being open at its center for reception of a cooking basket.

3. A deep fryer comprising a deep well cooking vessel having a plurality of side walls, a bracket rigidly mounted adjacent to the cooking vessel, a shaft carried by the bracket, a U-shaped frame swingably mounted on said shaft, an electric heating element having a pair of arcuate arms mounted on the bight of said U-shaped frame on the shaft for removable disposition within the cooking vessel, said heating element furthermore being embedded in a heavy-walled heat-distribution collar shaped to fit loosely within the cooking vessel adjacent the side walls and being open at its center for reception of a cooking basket, a thermostatic control operatively connected to the electric heating element and having a sensory bulb mounted in thermal relationship to the electric heating element, and a flexible spirally wound tube disposed around the shaft for connecting the bulb and the control.

4. A food service unit comprising a housing, a deep fryer having a deep-well cooking vessel mounted in said housing, a bracket rigidly mounted in said housing adjacent to said cooking vessel, a shaft carried by said bracket, a frame swingably mounted on said shaft, an electric heating element having a pair of arms mounted on the frame for up-tilting removable disposition within the cooking vessel, means mounted on said arms for retaining grease when said heating element is in up-tilted position, a thermostatic control mounted on said housing in spaced relation to said shaft and being operatively connected to said electric heating element, said thermostatic control being provided with a sensory bulb mounted in thermal relationship to said electric heating element, and a flexible spirally wound tube disposed around the shaft for connecting the bulb and the control.

5. A food service unit comprising a housing, a deep fryer having a deep-well cooking vessel mounted in said housing, a bracket rigidly mounted in said housing adjacent to said cooking vessel, a shaft carried by said bracket, an electric heating element having a pair of arcuate arms swingably mounted on the shaft for up-tilting removable disposition within the cooking vessel, a collar mounted on each of said arms for retaining grease when said heating element is in up-tilted position, a thermostatic control mounted on said housing in spaced relation to said shaft and being operatively connected to said electric heating element, said thermostatic control being provided with a sensory bulb mounted in thermal relationship to said electric heating element, and a flexible spirally wound tube disposed around the shaft for connecting the bulb and the control.

6. A deep fryer comprising a cooking vessel having a relatively deep well and an inclined apron thereabove, a bracket rigidly mounted adjacent to the cooking vessel, an electric heating element swingably mounted on the bracket for removable disposition within the cooking vessel, and means on said element for retaining grease when said heating element is in up-tilted position.

7. A deep fryer comprising a cooking vessel having a relatively deep well and an inclined apron thereabove, a bracket rigidly mounted adjacent to the cooking vessel, an electric heating element swingably mounted on the bracket for removable disposition within the cooking vessel, and cup-shaped collar elements mounted on said heating element for retaining grease when said heating element is in up-tilted position.

References Cited in the file of this patent

UNITED STATES PATENTS

| | | |
|---|---|---|
| 2,000,981 | Parsons | May 14, 1935 |
| 2,134,675 | Shroyer | Oct. 25, 1938 |
| 2,149,420 | Chambers | Mar. 7, 1939 |
| 2,215,929 | Husk | Sept. 24, 1940 |
| 2,222,883 | Smith | Nov. 26, 1940 |
| 2,232,998 | Cernohooz | Feb. 25, 1941 |
| 2,426,531 | Stevason | Aug. 26, 1947 |
| 2,448,634 | Smith | Sept. 7, 1948 |
| 2,627,445 | Lyon | Feb. 3, 1953 |
| 2,756,425 | Webber | July 24, 1956 |
| 2,773,276 | Pape | Dec. 11, 1956 |
| 2,794,897 | Giles | June 4, 1957 |
| 2,805,314 | Michaelis | Sept. 3, 1957 |

FOREIGN PATENTS

| | | |
|---|---|---|
| 338,814 | Italy | Mar. 31, 1936 |

OTHER REFERENCES

"How to Cast-In Calrod Heating Units," by H. M. Chatto, General Electric Review, vol. 43, No. 5, pp. 217–219, May 1940.